US008406818B2

(12) United States Patent
Roberts et al.

(10) Patent No.: US 8,406,818 B2
(45) Date of Patent: *Mar. 26, 2013

(54) SYSTEM AND METHOD FOR PROVIDING A VISUAL INDICATOR ON A COMMUNICATION DEVICE

(75) Inventors: Mike Roberts, Overland Park, KS (US); Shekhar Gupta, Overland Park, KS (US); Krishna Kolothuparambil Bhaskarankutty Nair, Olathe, KS (US)

(73) Assignee: CenturyLink Intellectual Property LLC, Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/555,369

(22) Filed: Jul. 23, 2012

(65) Prior Publication Data

US 2012/0288073 A1 Nov. 15, 2012

Related U.S. Application Data

(63) Continuation of application No. 12/491,912, filed on Jun. 25, 2009, now Pat. No. 8,260,363.

(51) Int. Cl.
*H04M 1/00* (2006.01)
*H04K 3/00* (2006.01)

(52) U.S. Cl. ............ 455/566; 455/567; 345/173
(58) Field of Classification Search .......... 455/466–567; 345/173
See application file for complete search history.

(56) References Cited

U.S. PATENT DOCUMENTS

| 8,260,363 B2 * | 9/2012 | Roberts et al. ........... 455/566 |
| 2006/0194619 A1 | 8/2006 | Wilcox et al. |
| 2008/0090618 A1 | 4/2008 | Lim et al. |
| 2008/0152124 A1 | 6/2008 | Ericson |

FOREIGN PATENT DOCUMENTS

JP 2001-308983 11/2001

* cited by examiner

*Primary Examiner* — Lee Nguyen
(74) *Attorney, Agent, or Firm* — Patton Boggs LLP

(57) ABSTRACT

Embodiments of the disclosed invention include an apparatus, method, and computer program product for providing a larger display area for viewing pictures and/or videos on a communication device. For example, in one embodiment, a communication device is disclosed comprising a plurality of display components for displaying an image that covers a plurality of sides of the communication device. In certain embodiments, a user first image is displayed in response to receiving an incoming call for providing a visible indicator for alerting the user of an incoming call.

20 Claims, 6 Drawing Sheets

SYSTEM AND METHOD FOR PROVIDING A VISUAL INDICATOR ON A COMMUNICATION DEVICE

CROSS REFERENCE TO RELATED APPLICATIONS

This Application is a Continuation of U.S. patent application Ser. No. 12/491,912, filed Jun. 25, 2009 now U.S. Pat. No. 8,260,363 entitled Visual Ringer; the entire teachings of which are incorporated herein by reference.

BACKGROUND OF THE INVENTION

The disclosed embodiments are related to communication devices and, in particular, to providing a user customizable visual indicator of an incoming call.

Communication devices have generally provided two types of visual indicators. One type is a small light-emitting diode (LED) that blinks to inform a user of an incoming call or a missed call. The other type of visual indicator is displaying a caller identification or image on a display screen associated with the communication device to inform a user of an incoming call. However, display screens associated with communication devices are generally small and face only one direction, thus, a user may not notice a visual indicator of an incoming call. For instance, if the communication device is far away and facing up, the user may not hear the ringtone nor notice the visual indicator. Similarly, if the device is in silent mode and/or is accidentally placed facing down, the user may not notice an incoming call.

Accordingly, certain of the disclosed embodiments seek to/provide solutions to one or more the above problems associated with visually notifying a user of an incoming call.

SUMMARY

Embodiments of the disclosed invention include a system, method, and computer program product for providing a visual indicator of an incoming call on a communication device. As referenced herein, an incoming call may include a voice call, a text message, and/or an e-mail message. For example, in one embodiment, a communication device is disclosed having one or more displays covering two or more surfaces of the communication device. The communication device includes circuitry for connecting the one or more displays to a processing component. The processing component is configured to display images on the one or more displays to generate a first image that covers the two or more surfaces of the communication device in response to receiving an incoming call. The processing component is further configured to display a second image on the one or more displays in response to forwarding the incoming call to voicemail.

In another embodiment, a method for providing a visual indicator of an incoming call on a mobile communication device is disclosed that includes receiving the incoming call at the mobile communication device and displaying a first image on two or more displays in response to receiving the incoming call. The method further includes displaying a second image on the one or more displays in response to forwarding the incoming call to voicemail.

Still, in another embodiment, a computer program product comprising a computer usable medium having a computer readable program code embodied therein is disclosed. The computer readable program code includes instructions to display a first image on one or more displays covering an entire exterior portion of a mobile communication device in response to receiving an incoming call to the mobile communication device, wherein the first image is a current profile image of a caller retrieved from a social networking website.

BRIEF DESCRIPTION OF THE DRAWINGS

Illustrative embodiments of the present invention are described in detail below with reference to the attached figures, which are incorporated by reference herein and wherein.

DETAILED DESCRIPTION

The disclosed embodiments and advantages thereof are best understood by referring to FIGS. 1-6 of the drawings, like numerals being used for like and corresponding parts of the various drawings. Other features and advantages of the disclosed embodiments will be or will become apparent to one of ordinary skill in the art upon examination of the following figures and detailed description. It is intended that all such additional features and advantages be included within the scope of the disclosed embodiments. Further, the illustrated figures are only exemplary and not intended to assert or imply any limitation with regard to the environment, architecture, design, or process in which different embodiments may be implemented.

Figure 1:
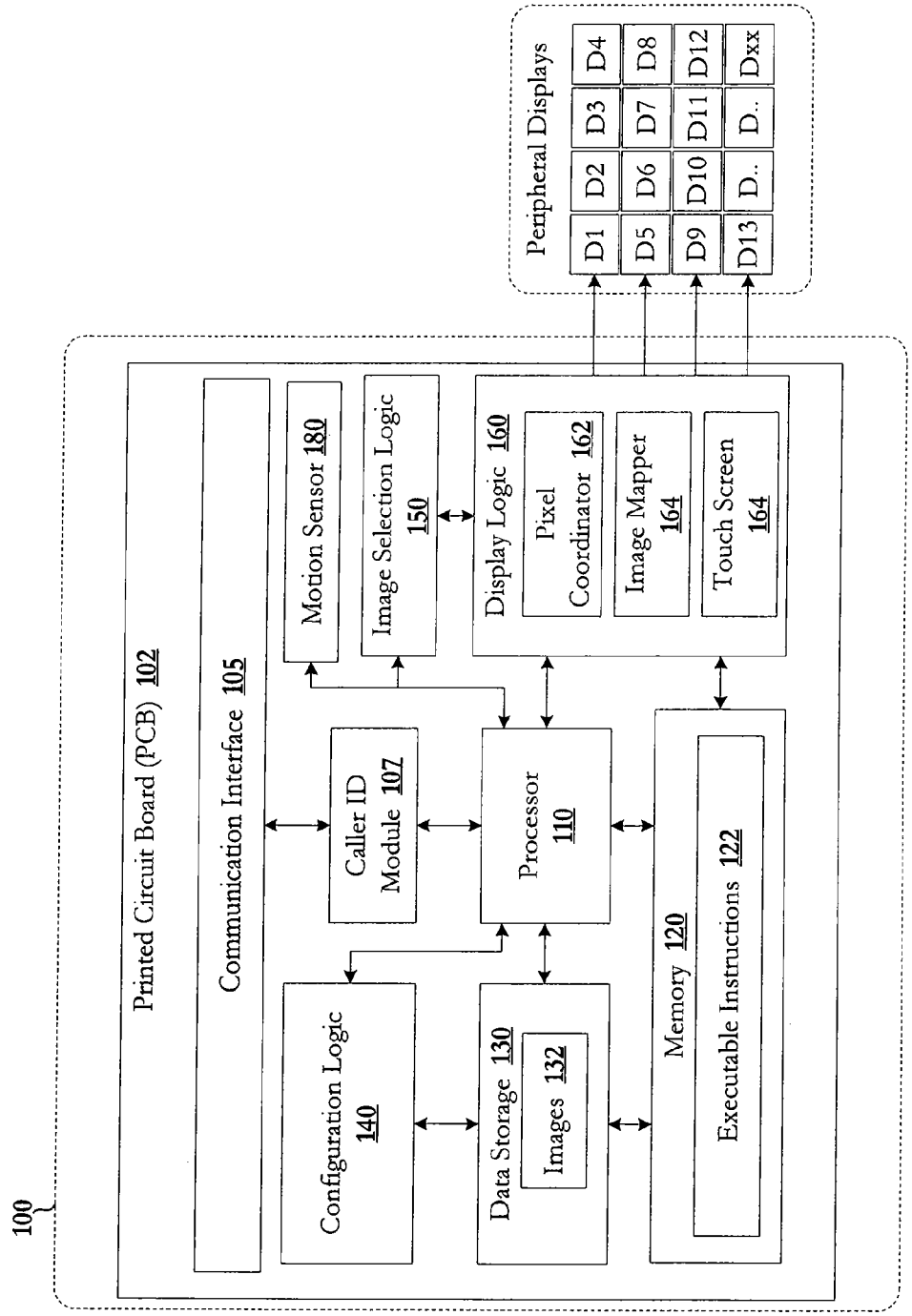
FIG. 1 depicts a communication device in accordance with certain embodiments.
Figure 2:
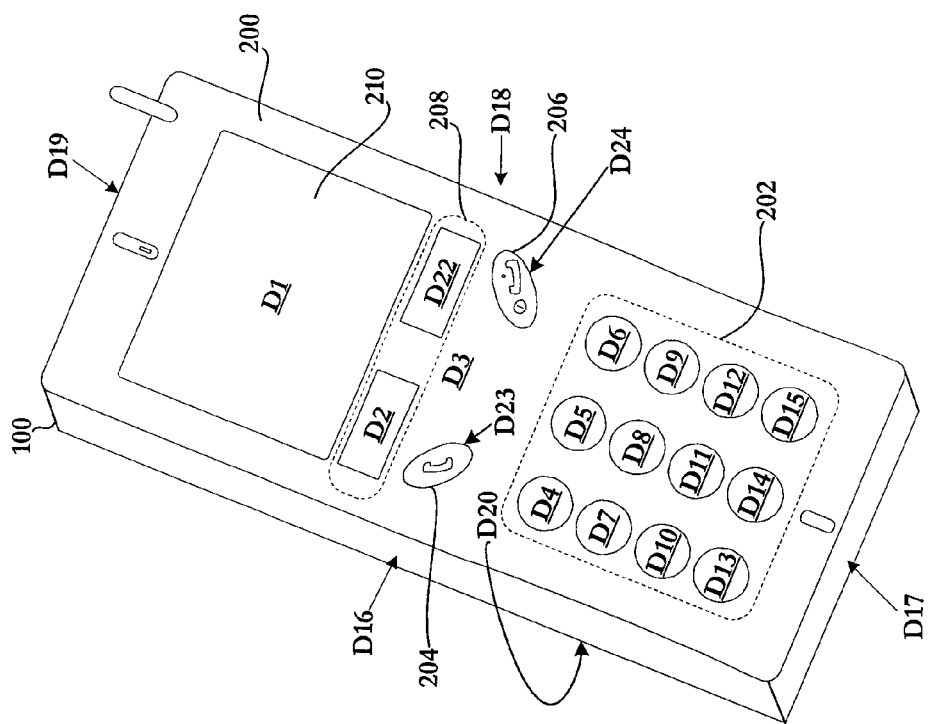
FIG. 2 depicts an exterior view of a communication device in accordance with one embodiment.

FIG. 1 depicts an embodiment of a communication device 100 in accordance with certain of the disclosed embodiments. In a preferred embodiment, communication device 100 includes a printed circuit board 102 for communicatively coupling components of communication device 100. For instance, printed circuit board 102 may mechanically support and electrically connect electronic components, such as, but not limited to, a processor 110, memory 120, and a storage unit 130, using conductive pathways, or traces, etched from copper sheets laminated onto a non-conductive substrate.

Processor 110 may comprise one or more single or multi-core processing units including, but not limited to, a central processing unit (CPU), a microprocessor, a graphics processing unit (GPU), and/or a digital signal processor. A central processing unit (CPU) or processor is an electronic circuit that can execute computer programs, such as, but not limited to, instructions 122 stored in memory 120. A microprocessor incorporates most or all of the functions of a central processing unit onto a single integrated circuit (IC). In some embodiments, a microprocessor may be utilized to perform a specific task. For example, a graphics processing unit is a specialized processor that offloads 3D graphics rendering from the central processing unit. Additionally, a digital signal processor is a specialized microprocessor designed specifically for digital signal processing.

In one embodiment, memory 120 may be volatile memory. Volatile memory is memory that requires power to maintain stored information. For example, in some embodiments, memory 120 may be random access memory (RAM). Random access memory stores currently executing instructions and/or other data utilized by an operating system, software application and/or other components of communication device 100.

Additionally, in a preferred embodiment, communication device 100 includes nonvolatile memory, such as, but not limited to, data storage unit 130. For example, in one embodiment, data storage unit may be a hard drive. In other embodiments, data storage unit 130 may be flash memory, such as, but not limited to, an xD (extreme Digital) card, SD (Secure Digital) card, or mini SD card. In some embodiments, data storage unit 130 may be removable and/or interchangeable with other communication devices. Additionally, in some embodiments, data storage unit 130 may store computer executable instructions, such as, but not limited to, software applications. In addition, in some embodiments, data storage unit 130 may store other types of data including, but are not limited, a configuration file, ring tones, audio files, still images, and video files. For example, in one embodiment, data storage unit 130 may include stored images 132. As referenced herein, the term image includes still images and video files. As will be further described, in certain embodiments, store images 132 may be utilized for displaying a visual indicator of an incoming call.

In addition, communication device 100 may include a communication interface 105. In one embodiment, communication interface 105 is a transceiver that is configured to send and receive data and voice communications from a cellular network. In addition, in some embodiments, communication interface 105 may support wireless data communications via an IP network, such as, but not limited to, the Internet.

In certain embodiments, communication device 100 may include caller identification logic 107 for determining the phone number of a calling device. As referenced herein, logic is defined as hardware, software, and/or a combination thereof. In some embodiments, caller identification logic 107 may also decode a received subscriber calling name associated with the calling device. Caller identification logic 107 presents the caller identification information on a display of communication device 100.

Additionally, in some embodiments, communication device 100 may include configuration logic 140 for enabling a user to configure the features and functions associated with communication device 100. For instance, configuration logic 140 may include logic for configuring the power modes of communication device 100, updating telephone numbers and address book information, and/or selecting a ring tone.

In addition, as will be further described, in some embodiments, communication device 100 may include image selection logic 150 for selecting an image, sequence of images, and/or video file that may be displayed on one or more peripheral displays 170. For instance, in one embodiment, peripheral displays 170 comprises a plurality of peripheral displays (D1-Dxx) that cover the entire exterior portion of the communication device. For example, in one embodiment, peripheral displays 170 comprises six display units, one for the top surface, one for the bottom surface, and one on each of the four lateral surfaces of communication device 100. In other embodiments, peripheral displays 170 may comprise of a flexible display component that wraps around one or more sides of communication device 100.

In some embodiments, peripheral displays 170 may comprise a number of display units corresponding to the number of individual components of communication device 100. For instance, in one embodiment, communication device 100 may include a set of raised keys, such as, but not limited to, a numbered keypad and/or a QWERTY style keyboard. In these embodiments, each individual key may be layered with a separate display unit. In some embodiments, a display unit may consist of a single pixel. For instance, as will be further described, in a preferred embodiment, an OLED display may be printed or layered on top of each component.

Additionally, in some embodiments, communication device 100 may include display logic 160 comprising pixel coordinator 162 and image mapper 164 for displaying the selected image on peripheral displays 170 to cover the exterior portion of communication device 100 with a selected image. For instance, in one embodiment, pixel coordinator 162 determines the placement/arrangement of the pixels associated with each peripheral display and stores the pixel coordinates in memory. A pixel (or picture element) is the smallest item/block of information in an image. Image mapper 164 uses the pixel coordinates associated with each peripheral display for mapping a selected image onto peripheral displays 170 to create an image that spans across the multiple displays.

In addition, in certain embodiments, communication device 100 may include touch screen logic 166 for detecting a user's touch. For instance, in one embodiment, peripheral displays 170 may display one or more control keys in response to detecting a user's touch, or may turn off peripheral displays 170, and/or may automatically answer an incoming call.

Further, in some embodiments, communication device 100 may include a motion sensor 180. For instance, in one embodiment, motion sensor 180 may utilize to determine whether communication device 100 is in motion. For example, in one embodiment, motion sensor 180 may be utilized automatically turn on or off, or trigger changes to displayed images on peripheral displays 170 in response to detecting a user picking up communication device 100. In other embodiments, communication device 100 may be configured to automatically answer an incoming call in response to detecting a user picking up communication device 100.

With reference now to FIG. 2A, an external embodiment of communication device 100 is depicted in accordance with certain embodiments. In the depicted embodiment, communication device 100 comprises of a housing 200, a set of raised numbered keys 202, a call button 204, an end-call button 206, a set of control keys 208, and a display screen 210. In accordance with certain embodiments, each component may be layered with a separate display unit during the manufacturing process. For instance, as will be further described, in one embodiment, each individual number key within the set of raised numbered keys 202 may be respectively layered with a separate display component D4-D15. In addition, call button 204 and end-call button 206 may be respectfully layered with separate display components D23 and D24. Similarly, the set of control keys 208 may be respectfully layered with separate display components D2 and D22. Additionally, in certain embodiments, display screen 210 may be the same type and/or a different type of display component as the other components of communication device 100.

In some embodiments, housing 200 may include one or more display components, such as, but not limited to, display component D3 and D16-D20. For example, display component 3 (D3) may be layered on the front surface of communication device 100. Display components 16 and 18 (D16, D18) may be respectively layered on each side surface of communication device 100. Display components 17 and 19 may be respectively layered on the bottom and top surface of communication device 100. Additionally, display component 20 (D20) may be layered on the back surface of communication device 100. Alternatively, in other embodiments, housing 200 may be layered with a wrap around display component that covers one or more surfaces.

Display components 1 through 24 may utilize any type of display technology including, but not limited to, liquid crystal display (LCD), LED, OLED, plasma, and/or other types of suitable display technologies for generating an image. Liquid crystal display consists of two layers of transparent polarized material. One of the layers is coated with a special polymer that holds the individual liquid crystals. Current is then passed through the individual crystals, which allow the crystals to pass or block light to create images. On the other hand, plasma technology employs the burning of phosphors to generate an image. An electrophoretic display forms visible images by rearranging charged pigment particles using an applied electric field.

In a preferred embodiment, communication device 100 utilizes organic light emitting diode (OLED) technology displays for generating an image. OLED is a light emitting diode whose emissive electroluminescent layer is composed of a film of organic compounds. OLEDs emit light through a process called electrophosphorescence. A significant benefit of OLED displays is that OLEDs do not require a backlight to function. Additionally, OLED displays draw far less power than other types of display technology, and therefore, can operate longer on the same charge. Because there is no need for a backlight, display components 1 through 24 can be very thin. For example, OLED displays may be as thin as 500 nanometers in thickness or about 200 times thinner than human hair.

Figure 3:
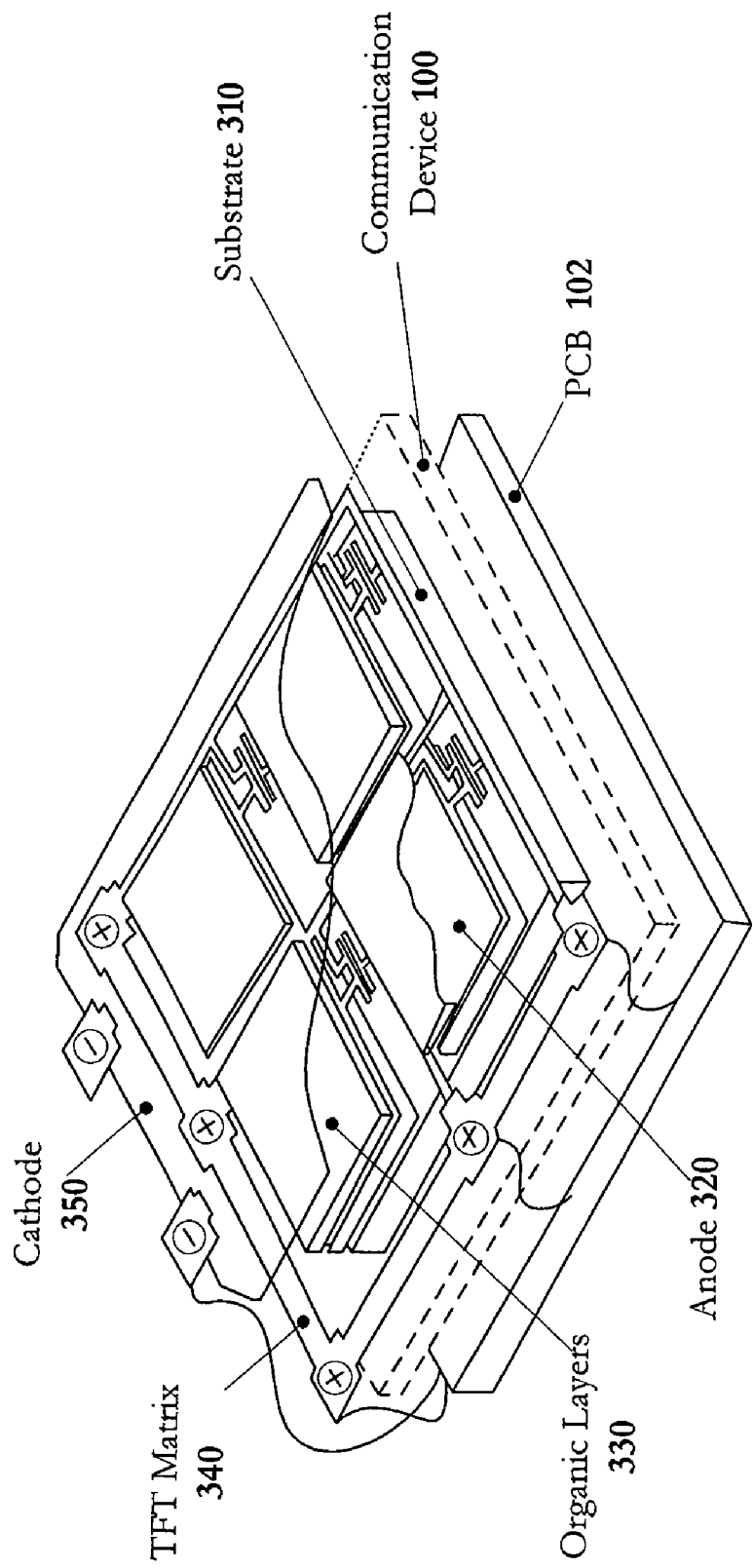
FIG. 3 depicts an embodiment of a display component that may be utilized for displaying an image on a communication device.

FIG. 3 depicts an embodiment of an OLED display 300 the may be utilized by communication device 100 for displaying an image that spans the entire exterior portion of communication device 100. Like an LED, OLED display 300 is a solid-state semiconductor device. OLED display 300 comprises layers of organic material 330. For example, in one embodiment, organic material layers 330 may include an emissive layer and a conducting layer. The emissive layer is made of organic plastic molecules that transport electrons from cathode 350 for generating light. For example, in one embodiment, polyfluorene may be a polymer used in the emissive layer. The conducting layer is made of organic plastic molecules that transport "holes" from anode 320. In one embodiment, polyaniline may be a polymer used in the conducting layer. Anode 320 generates electron "holes" by removing electrons when a current flows through the device. In contrast, cathode 350 is used to inject electrons when a current flows through the device. The current is received from circuitry that connects cathode 350 to printed circuit board 102 and/or other components of communication device 100. Additionally, in some embodiments, organic material layers 330 may comprise three or more layers of organic material. The additional layers may be utilized to help transport electrons from cathode 350 to the emissive layer. Further, in some embodiments, OLED display 300 may include a substrate component 310. Substrate component 310 may be used to provide support for the components of OLED display 300. In some embodiments, substrate component 310 may be clear plastic, glass, and/or foil.

In certain embodiments, OLED display 300 may be either a passive-matrix OLED (PMOLED) or an active-matrix OLED (AMOLED). Passive-matrix OLEDs have strips of cathode, organic layers, and strips of anode. The anode strips are arranged perpendicular to the cathode strips. The intersections of the cathode and anode make up the pixels where light is emitted. External circuitry applies current to selected strips of anode and cathode for determining which pixels get turned on. The brightness of each pixel is proportional to the amount of applied current.

An active-matrix OLED may include a TFT matrix 340, as depicted in FIG. 3. TFT matrix 340 is a thin film transistor (TFT) array that forms a matrix. TFT matrix 340 is the circuitry that determines which pixels get turned on to form an image. AMOLEDs consume less power than PMOLEDs because the TFT array requires less power than external circuitry. In addition, AMOLEDs have faster refresh rates suitable for video.

Additionally, in certain embodiments, OLED display 300 is a transparent OLED. For example, in one embodiment, OLED display 300 may include only transparent components (substrate, cathode and anode) and, when turned off, OLED display 300 is substantially transparent. For instance, in one embodiment, a transparent OLED display 300 may be layered on top of a set of function keys (e.g., number keys) of communication device 100 for enabling a user to see the printed function and/or number (e.g., talk, 1, 2, 3, . . . ) on the function keys when OLED display 300 is in an off mode.

Further, in a preferred embodiment, OLED display 300 utilizes foldable OLEDs. Foldable OLEDs have substrates made of very flexible metallic foils or plastics. Foldable OLEDs are very lightweight and durable. Therefore, by utilizing foldable OLEDs, damage to OLED display 300 may be reduced.

OLED display 300 may be layered on communication device 100 using one or more known or later developed techniques. For example, in one embodiment, OLED display 300 may be layered on communication device 100 using vacuum thermal evaporation. Vacuum thermal evaporation utilizes a vacuum chamber to gently heat/evaporate the organic molecules. The organic molecules are then allowed to condense as a thin film. Similarly, OLED display 300 may be manufactured using organic vapor phase deposition. In a preferred embodiment, OLED display 300 is layered on communication device 100 using inkjet technology to spray the OLEDs onto communication device 100 or components thereof similar to spraying ink onto a piece of paper.

Figure 4:
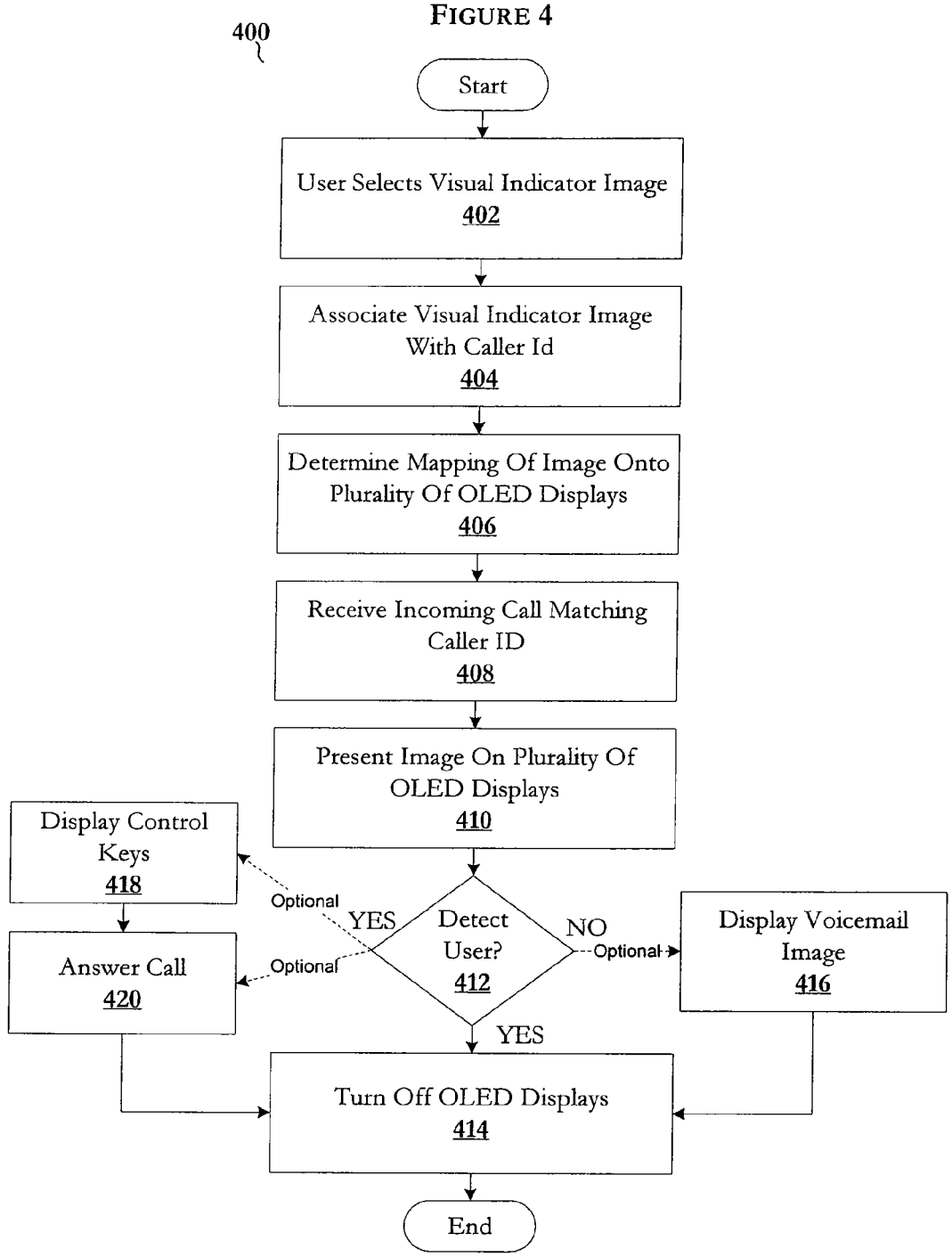
FIG. 4 depicts an embodiment of a process for providing a visual indicator on a communication device in response to receiving an incoming call.

With reference now to FIG. 4, an embodiment of a process 400 is presented in accordance with certain embodiments for providing a visual indicator in response to receiving an incoming call to communication device 100. Process 400 begins, at step 402, by receiving a user selection of an image that will be displayed on a plurality of displays that spans a plurality of sides of a communication device in response to receiving an incoming call for providing a visual indicator to notify a user of the incoming call. In one embodiment, the image may be a still image, a sequence of images, and/or a video file. As referenced herein, the phrase "a plurality of sides" means two or more sides that face different directions.

In some embodiments, process 400 may, at step 404, associate the selected image with a user specified caller identifier. Additionally, in certain embodiments, the image may be stored locally on communication device 100 and/or may be stored on a remote network device. For example, in certain embodiments, communication device 100 may communicate with a network device such as, but not limited to, a Web application server for enabling a user to link a caller ID with a particular social networking website user account. In these embodiments, communication device 100 may retrieve a profile image of the caller from a social networking website for displaying the profile image in response to receiving a call from the caller. In certain embodiments, communication device 100 may store the profile image locally and may periodically communicate with the social networking website to update the profile image. In other embodiments, communication device 100 may retrieve the current profile image in real-time from the social networking website in response to receiving a call associated with the user specified caller ID. In other embodiments, a user may select any type of image, sequence of images, and/or video that is displayed in response to receiving an incoming call.

At step 406, the process determines the mapping coordinates for mapping the image onto the plurality of displays associated with the communication device. For instance, in one embodiment, the process may determine the pixel coordinates associated with each display component and utilize that information for determining the mapping of the image. When the process receives an incoming call matching the caller identification at step 408, the process, at step 410, presents the image on the plurality of displays of the communication device for providing a visual indicator of the incoming call.

In one embodiment, the image may span/wrap around the entire exterior portion of communication device 100. In other embodiments, the image may appear only on non-downward facing sides of communication device 100 to conserve energy and for properly displaying the image only on viewable sides. For instance, communication device 100 may include an orientation sensor or touch sensor for determining a downward facing side. A downward facing side is any side that is in contact with a surface. For example, if communication device 100 is placed on a desk, the side of communication device 100 in contact with the desk is a downward facing side. The downward facing side of communication device 100 may change depending on how communication device 1000 is oriented.

In some embodiment, the process, at step 412, may determine whether a user picks up communication device 100 using a touch sensor and/or a motion sensor. For instance, in certain embodiments, communication device 100 may comprise flat touch screen panels such as depicted in FIG. 6A. In these embodiments, process 400, at step 418, may display a set of control keys, such as, but not limited to, an answer button for enabling a user to answer the incoming call. In other embodiments, the process, at step 420, may have been configured to automatically answer the incoming call in response to detecting a user. Optionally, in certain embodiments, the process may, at step 416, display a different image in response to the incoming call being routed to voicemail. Additionally, in certain embodiments, the process, at step 414, may turn off the displays in response to detecting the presence of a user, with process 400 terminating thereafter.

Figure 5:
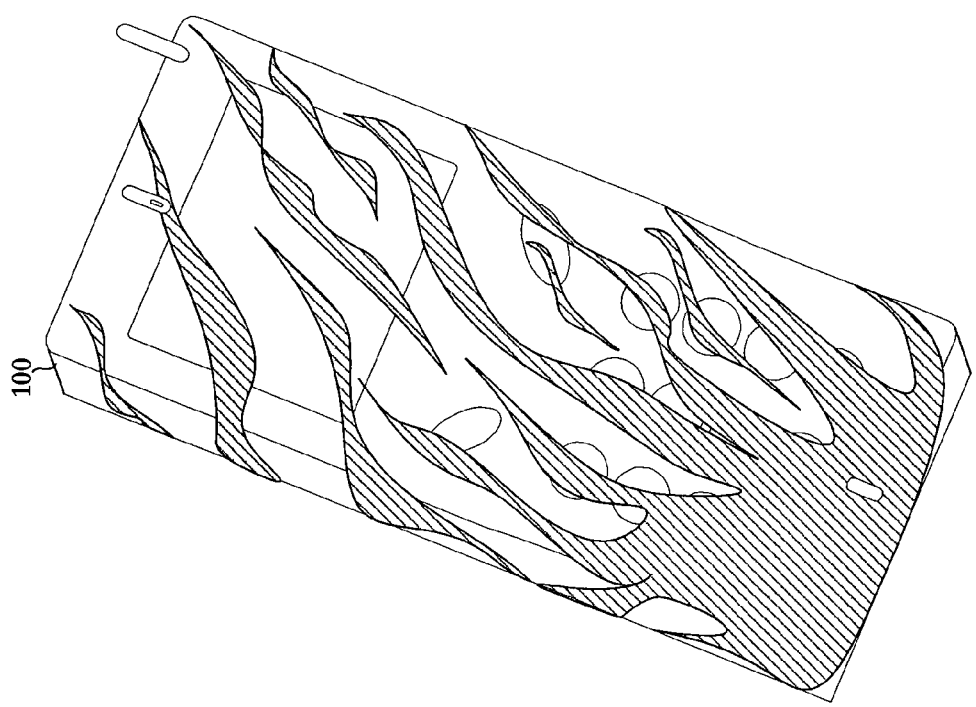
FIG. 5 illustrates an image being depicted on a communication device in accordance with certain embodiments.

FIG. 5 illustrates an embodiment of communication device 100 in accordance with the disclosed embodiments. In the depicted embodiment, an image and/or video of a fire is selected as a visual indicator image. In response to receiving an incoming call, communication device 100 displays the flame image and/or video on the plurality of display components to create an image that communication device 100 is covered in flames. In some embodiments, the flame image may be generated by communication device 100 by rapidly displaying a sequence of flame images that produces a visual effect of a real fire. In other embodiments, communication device 100 may include logic for modifying the flame image to produce a dynamically moving image. For instance, in one embodiment, communication device 100 may utilize the stored pixel mapping data to dynamically turn particular pixels on and/or off to generate of a visual effect of a moving flame. In one embodiment, in response to detecting a user's presence of (e.g., a touch and/or movement), communication device 100 turns off the display components revealing the standard components of communication device 100.

In other embodiments, communication device 100 may include only flat surfaces. For example, FIG. 6A depicts an embodiment of a communication device 600 in accordance with the disclosed invention. In the depicted embodiment, communication device 600 may comprise of one or more touch screen display components. For instance, in one embodiment, communication device 600 may comprise of six display components labeled D50-D60. In this embodiment, each display component is oriented to display an image on a particular side of communication device 600, as depicted by the direction of the arrows respectively associated with D50-D60. In other embodiments, communication device 600 may comprise a display component that covers one or more sides of communication device 600. Additionally, in certain embodiments, communication device 600 may include logic for presenting a touchable keypad and/or other information for enabling a user to utilize communication device 600.

Figure 6B:
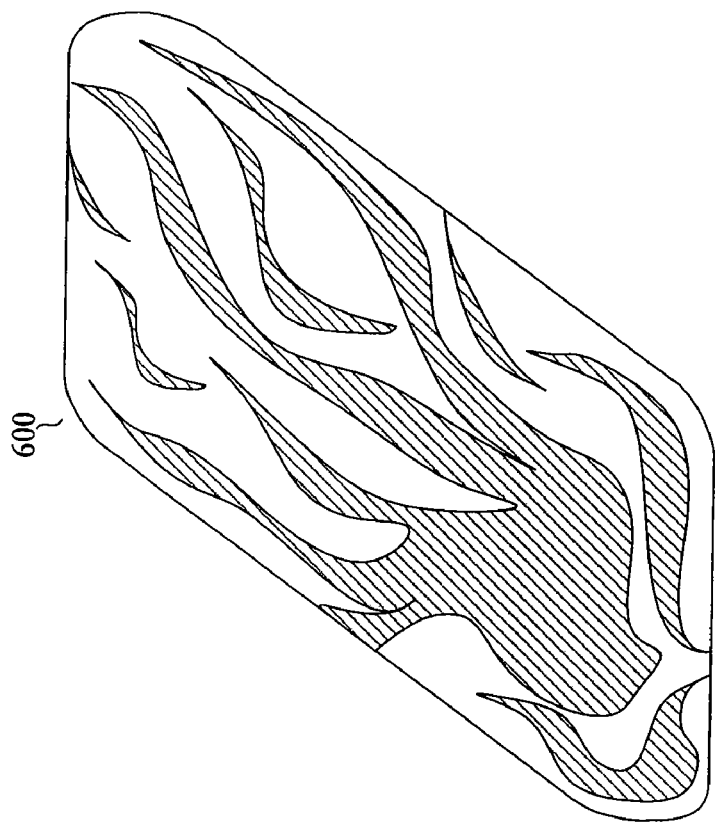
FIG. 6B illustrates an image presented on the communication device of FIG. 6A.
Figure 6A:
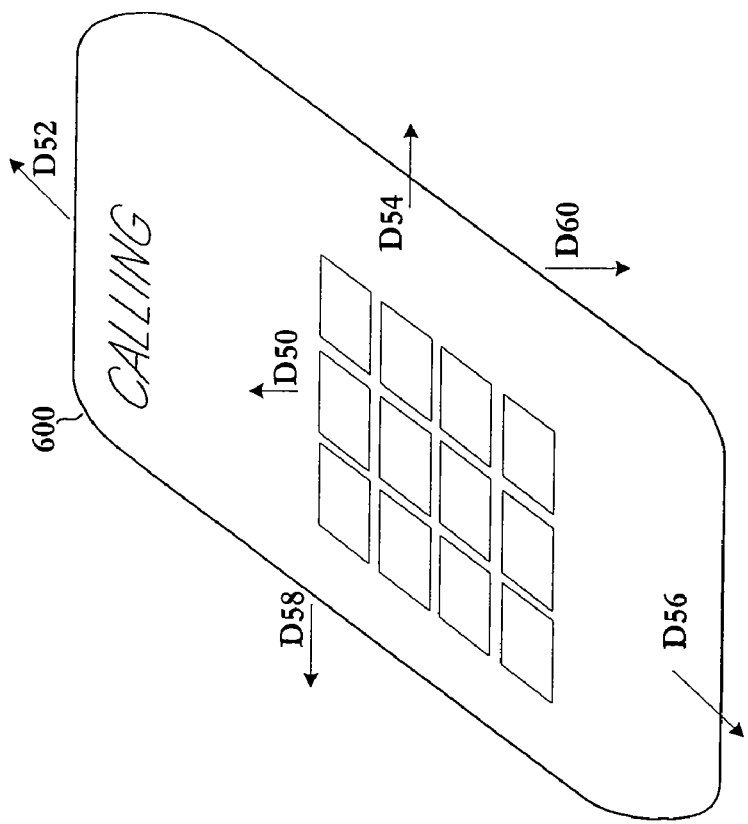
FIG. 6A depicts another embodiment of a communication device in accordance with disclosed embodiments.

FIG. 6B illustrates the flame image and/or video presented on communication device 600. In one embodiment, the image is displayed in response to receiving an incoming call. Of course, in certain embodiments, communication device 100 and/or communication device 600 may simply utilize one or more of the plurality of display components for providing a larger display area for viewing pictures and/or videos. Additionally, in certain embodiments, different images may be simultaneously displayed on one or more display components and/or sides of communication device 100/600. For example, in one embodiment, communication device 100 may display a video on a front side of communication device 100, display a stock ticker on one side of communication device 100, and display a headline news ticker on the other side of communication device 100.

Accordingly, the disclosed embodiments provide a system and method for providing a more visible indicator of an incoming call on a communication device. In addition, the disclosed embodiments provide a larger display area for viewing pictures and/or videos on the communication device. The disclosed embodiments are described above with reference to flowchart illustrations, sequence diagrams, and/or block diagrams. Each block of the flowchart illustrations and/or block diagrams, and combinations of blocks in the flowchart illustrations and/or block diagrams, may be implemented by computer program instructions. In addition, the flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which may include one or more executable instructions for implementing the specified logical function(s).

In some alternative implementations, the functions noted in the block may occur out of the order noted in the figures and/or may be omitted. In addition, two blocks shown in succession may, in fact, be executed substantially concurrently, or the blocks may sometimes be executed in the reverse order, depending upon the functionality involved. Further, in some embodiments, each block of the block diagrams and/or flowchart illustration, and combinations of blocks in the block diagrams and/or flowchart illustration, may be implemented entirely with hardware or as a software embodiment (including firmware, resident software, micro-code, etc.) or an embodiment combining software and hardware aspects for performing the specified functions or acts.

Additionally, computer program instructions for executing the disclosed embodiments may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks. The computer program instructions may also be loaded onto a data processing apparatus to cause a series of operational steps to be performed on the data processing system to produce a computer implemented process such that the instructions which execute on the data processing system provide processes for implementing the functions/acts specified in the flowchart and/or block diagram block or blocks.

The terminology used herein is for describing particular embodiments only and is not intended to be limiting of the invention. As used herein, the singular forms "a", "an" and "the" are intended to include the plural forms as well, unless the context clearly indicates otherwise. It will be further understood that the terms "comprise" and/or "comprising," when used in this specification and/or the claims, specify the presence of stated features, integers, steps, operations, elements, and/or components, but do not preclude the presence or addition of one or more other features, integers, steps, operations, elements, components, and/or groups thereof.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The disclosed embodiments were chosen to explain the principles of the invention and the practical application, and to enable others of ordinary skill in the art to understand the invention for various embodiments with various modifications as are suited to the particular use contemplated.

We claim:

1. A communication device comprising:
   one or more displays covering two or more surfaces of the communication device; and
   circuitry for connecting the one or more displays to a processing component;
   wherein the processing component is configured to display images on the one or more displays to generate a first image that covers the two or more surfaces of the communication device in response to receiving an incoming call; and
   wherein the processing component is further configured to display a second image on the one or more displays in response to forwarding the incoming call to voicemail.

2. The communication device of claim 1, wherein the one or more displays covers an entire exterior portion of the communication device; and
   wherein the first image covers the entire exterior portion of the communication device.

3. The communication device of claim 1, wherein the first image covers all non-downward facing surfaces of the communication device.

4. The communication device of claim 1, wherein the first image is selected based on a caller identification associated with the incoming call, and wherein the first image is a current profile image of a caller retrieved from a social networking website.

5. The communication device of claim 1, further comprising:
   a motion sensor for detecting movement of the communication device; and
   logic for turning off the one or more displays in response to the motion sensor detecting movement of the communication device.

6. The communication device of claim 1, further comprising touch screen logic for turning off the one or more displays in response to detecting a user's touch.

7. The communication device of claim 1, further comprising display logic for displaying a set of control keys associated with the communication device in response to a determination that a user is handling the communication device.

8. The communication device of claim 1, wherein the two or more surfaces of the communication device includes a set of raised keys.

9. The communication device of claim 8, wherein each individual key within the set of raised keys is layered with a separate display component.

10. The communication device of claim 1, further comprising communication logic for receiving the images from a network device in communication with the communication device.

11. The communication device of claim 1, wherein the one or more displays are transparent when not displaying an image.

12. The communication device of claim 1, wherein the images include video images or a sequence of images.

13. A method for providing a visual indicator of an incoming call on a mobile communication device, the method comprising:
    receiving the incoming call at the mobile communication device;
    displaying, using a processor of the mobile communication device, a first image on two or more displays in response to receiving the incoming call; and
    displaying a second image on the one or more displays in response to forwarding the incoming call to voicemail.

14. The method of claim 13, further comprising selecting the first image based on a caller identification associated with the incoming call.

15. The method of claim 14, further comprising retrieving the first image from a network device.

16. The method of claim 13, further comprising turning off the one or more displays in response to detecting movement of the mobile communication device.

17. The method of claim 13, further comprising displaying a set of control keys on the one or more displays in response to detecting movement of the mobile communication device.

18. The method of claim 13, further comprising configuring the mobile communication device to automatically answer the incoming call in response to detecting a user picking up the mobile communication device.

19. A computer program product comprising a computer usable medium having a computer readable program code embodied therein, the computer readable program code comprising instructions to display a first image on one or more displays covering an entire exterior portion of a mobile communication device in response to receiving an incoming call to the mobile communication device, wherein the first image is a current profile image of a caller retrieved from a social networking website.

20. The computer program product of claim 19, wherein the computer readable program code further comprises instructions to automatically answer the incoming call in response to detecting a user picking up the mobile communication device.

* * * * *